F. H. HENDEY.
APPARATUS FOR HANDLING REELS OR SPOOLS OF INSULATED WIRE.
APPLICATION FILED DEC. 16, 1916.
1,370,535.
Patented Mar. 8, 1921.
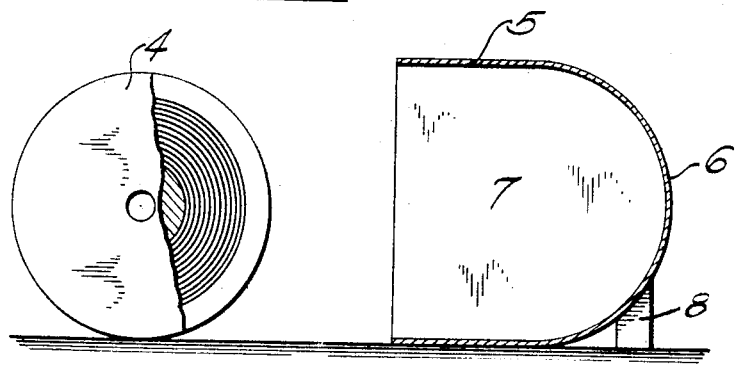
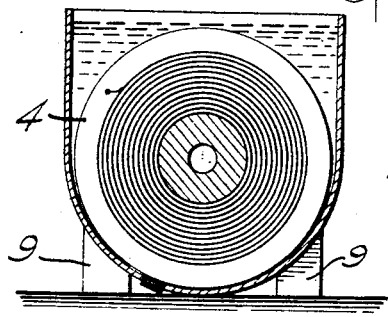
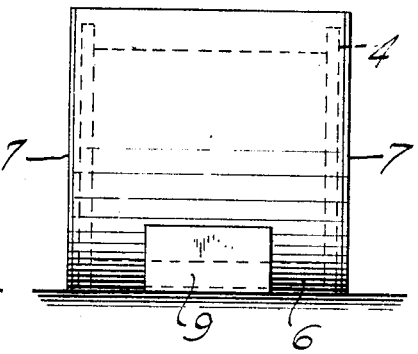

UNITED STATES PATENT OFFICE.

FREDERICK H. HENDEY, OF PASSAIC, NEW JERSEY, ASSIGNOR TO THE OKONITE COMPANY, OF PASSAIC, NEW JERSEY, A CORPORATION OF NEW JERSEY.

APPARATUS FOR HANDLING REELS OR SPOOLS OF INSULATED WIRE.

1,370,535.      Specification of Letters Patent.      Patented Mar. 8, 1921.

Application filed December 16, 1916. Serial No. 137,473.

*To all whom it may concern:*

Be it known that I, FREDERICK H. HENDEY, a citizen of the United States, residing at Passaic, in the county of Passaic and State of New Jersey, have invented certain new and useful Improvements in Apparatus for Handling Reels or Spools of Insulated Wire, of which the following is a specification.

This invention relates to apparatus for handling reels or spools of insulated wire incidental to certain electrical tests which in practice are applied to the wire. It has been customary to place such a spool or reel of insulated wire in a stationary tank of water where it is left while tests are made to determine insulating qualities, etc. Inasmuch as these spools or reels of wire sometimes weigh as much as several tons the expense of the necessary power and labor involved has been a considerable item.

It is one of the objects of my invention to provide a method by the practice of which the power and labor required for placing a reel of wire in the testing bath and in removing it therefrom, are reduced to the minimum. The method consists in providing, as a holder or container for the testing bath, a round bottomed tank, with straight sides and ends, and with its walls of relatively very slight thickness, this tank being preferably balanced so that it tends to assume the horizontal position, resting upon its flat side wall. The method is practised by providing such a tank, empty of course, laying it upon its side, and then rolling the reel into it, which causes the tank with the reel therein to assume and maintain its normal balanced vertical position; after which the tank is filled with water or other testing liquid and the electrical tests take place. If desired, to avoid accident, the tank may be blocked up to positively hold it in its vertical position. After the test, when it is desired to remove the reel from the tank, the bath is drawn off and the tank again rolled on its bottom, gradually bringing one side thereof to the floor and causing the reel to roll out.

The apparaus for use in connection with the practice of this method includes a tank of the sort referred to, preferably provided with means for drawing off liquid therefrom and for supplying liquid thereto, and if desired, means for positively holding the tank in vertical or normal position. The invention will be explained in the course of the following description thereof, and the scope of protection which I contemplate for the same will appear from the appended claims.

In the accompanying drawings, which are to be taken as a part of this specification and in which I have illustrated apparatus devised for the practice of my method, Figure 1 is a view illustrating a tank in position to have a reel of insulated wire or the like rolled into it, the tank being shown in vertical section and the reel partly in section and partly in elevation; Fig. 2 is a vertical sectional view of the tank, with the reel and the testing bath therein, the tank being of course in its normal vertical position; Fig. 3 is a side elevation of the subject matter of Fig. 2, the view being taken at right angles to that of Fig. 2.

Referring to the numerals on the drawing, there is indicated at 4 a spool or reel of insulated wire, which may be rolled on its end flanges. 5 indicates a tank for receiving and containing the reel as well as the testing bath, which may be water or some other liquid. In the embodiment shown this tank has plane sides, plane ends, and a half round bottom 6, which merges into the plane side walls and is symmetrically disposed with relation thereto, so that the tank may oscillate on its half round bottom between the planes of its end walls 7. Preferably, therefore, the tank is balanced so that while it may, with the expenditure of very little power, be brought to the vertical position indicated in Fig. 2, it will tend to assume and maintain the position shown in Fig. 1 unless the reel is rolled into it, which brings it to the vertical position. The plane side walls 5 of the tank, at any rate, should be as thin as possible, so that when the tank is in the Fig. 1 position the reel 4 may be rolled into it, with the edge of the side 5 of the tank that rests upon the floor, presenting as little obstacle to the travel of the reel as possible. In order that one or two men may take care of the whole operation the tank may be held in the Fig. 1 position if desired by means of a block 8 applied against the bottom, which block may be removed after the reel has passed into the tank, whereupon the further travel of the reel upon the curved bottom of the tank will cause the tank to roll over to the Fig. 2 position, in which it may be held if desired by means of blocks 9. The tank is now ready to receive the bath, which may be supplied from a source of supply indicated at 10, after which the usual tests are conducted. Upon the completion of the tests the testing bath is removed from the tank, as by opening up the draw-off cock 11, the blocks 9 are removed, and the tank is rolled over again to the Fig. 1 position, which results in the rolling out of the reel.

If desired the bottom 6 might be provided with a plane portion midway between the two side walls 5, said plane portion merging into the curved portions of the bottom.

The result of this construction is that when the tank has been brought from the Fig. 1 to the Fig. 2 position it rests upon the central plane portion of the bottom and holds that vertical position without the aid of blocks 9. However, slightly more power will be necessary with such a construction to bring the tank from the Fig. 2 position back to the Fig. 1 position, and therefore I prefer the form of tank shown in the drawings, used with or without the blocks 8 and 9.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described, and all statements of the scope of the invention which, as a matter of language, might be said to fall therebetween.

I claim:

1. An apparatus of the kind described, comprising a tank having parallel side walls, parallel end walls and a curved bottom wall connecting the side walls, said tank adapted to assume a normal horizontal position but balanced to roll on its bottom wall when its equilibrium is disturbed.

2. An apparatus of the kind described, comprising a tank having parallel side walls, parallel end walls and a curved bottom wall connecting the side walls, said tank adapted to assume a normal horizontal position but balanced to roll on its bottom wall when loaded to the inside of its balanced point.

3. An apparatus of the kind described, comprising a tank having parallel side walls, parallel end walls and a curved bottom wall connecting the side walls, said tank adapted to assume a normal horizontal position but balanced to roll on its bottom wall when its equilibrium is disturbed and means for holding the tank in either position.

4. An apparatus of the kind described, comprising a tank having parallel side walls, parallel end walls and a curved bottom wall connecting the side walls, said tank adapted to assume a normal horizontal position but balanced to roll on its bottom wall when its equilibrium is disturbed and means for holding it in the position in which it rests upon its bottom.

5. An apparatus of the kind described, comprising a tank having parallel side walls, parallel end walls and a curved bottom wall merging into the plane of the side walls, said tank adapted to assume a normal horizontal position but balanced to roll on its bottom wall when its equilibrium is disturbed and blocks for holding the tank in either position.

In testimony whereof I affix my signature in presence of two witnesses.

FREDERICK H. HENDEY.

Witnesses:
 Wm. F. Gaston,
 Fred W. Gaston.